US008479028B2

(12) United States Patent
Tsai et al.

(10) Patent No.: US 8,479,028 B2
(45) Date of Patent: *Jul. 2, 2013

(54) TECHNIQUES FOR COMMUNICATIONS BASED POWER MANAGEMENT

(75) Inventors: Jr-Shian Tsai, Hillsboro, OR (US); Tsung-Yuan Tai, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1183 days.

This patent is subject to a terminal disclaimer.

(21) Appl. No.: 12/208,763

(22) Filed: Sep. 11, 2008

(65) Prior Publication Data

US 2009/0077394 A1    Mar. 19, 2009

Related U.S. Application Data

(60) Provisional application No. 60/973,035, filed on Sep. 17, 2007, provisional application No. 60/973,031, filed on Sep. 17, 2007, provisional application No. 60/973,038, filed on Sep. 17, 2007, provisional application No. 60/973,044, filed on Sep. 17, 2007.

(51) Int. Cl.
*G06F 1/00* (2006.01)
(52) U.S. Cl.
USPC .......................................... 713/320; 713/310
(58) Field of Classification Search
USPC ................. 713/300–340; 710/29, 52
See application file for complete search history.

(56) References Cited

U.S. PATENT DOCUMENTS

| 5,794,058 | A  | * | 8/1998 | Resnick | 713/323 |
|---|---|---|---|---|---|
| 5,903,766 | A  | * | 5/1999 | Walker et al. | 713/323 |
| 6,085,325 | A  | * | 7/2000 | Jackson et al. | 713/300 |
| 7,171,570 | B2 | * | 1/2007 | Cox et al. | 713/300 |
| 7,225,350 | B2 | * | 5/2007 | Gutman et al. | 713/323 |
| 7,392,416 | B2 | * | 6/2008 | Watts et al. | 713/323 |
| 7,565,562 | B2 | * | 7/2009 | Chary | 713/324 |
| 7,689,846 | B1 | * | 3/2010 | Athas | 713/322 |
| 7,689,851 | B2 | * | 3/2010 | Sawyers et al. | 713/323 |
| 7,941,683 | B2 | * | 5/2011 | Branover et al. | 713/323 |
| 2003/0123331 | A1 | * | 7/2003 | Poisner | 368/113 |
| 2005/0149768 | A1 | * | 7/2005 | Kwa et al. | 713/300 |
| 2008/0005405 | A1 | * | 1/2008 | Innis et al. | 710/56 |

\* cited by examiner

*Primary Examiner* — Tim T Vo
*Assistant Examiner* — Trisha Vu

(57) ABSTRACT

Techniques for communications based power management are described. An apparatus may comprise a managed power system having a communications sub-system and a computing sub-system, the communications sub-system to include a network state module operative to determine communications power state information, and send a power management message with the communications power state information. The apparatus may further comprise a power management module to receive the power management message, retrieve the communications power state information from the power management message, and manage power states for the computing sub-system based on the communications power state information. Other embodiments are described and claimed.

25 Claims, 3 Drawing Sheets

300

RECEIVE A POWER MANAGEMENT MESSAGE WITH COMMUNICATIONS POWER STATE INFORMATION OVER A COMMUNICATIONS BUS BY A POWER MANAGEMENT MODULE FROM A COMMUNICATIONS SUB-SYSTEM OF A MANAGED POWER SYSTEM
302

DETERMINE A COMPUTING POWER STATE AND A COMPUTING POWER STATE DURATION PERIOD FOR A COMPUTING SUB-SYSTEM OF THE MANAGED POWER SYSTEM BASED ON THE COMMUNICATIONS POWER STATE INFORMATION
304

SWITCH THE COMPUTING SUB-SYSTEM TO THE COMPUTING POWER STATE FOR THE COMPUTING POWER STATE DURATION PERIOD
306

FIG. 3

TECHNIQUES FOR COMMUNICATIONS BASED POWER MANAGEMENT

CROSS REFERENCE TO RELATED APPLICATIONS

This application is a non-provisional of, and claims priority to U.S. Patent Provisional Application Ser. No. 60/973,035 titled "TECHNIQUES FOR COMMUNICATIONS BASED POWER MANAGEMENT" filed on Sep. 17, 2007, and is related to U.S. Patent Provisional Application Ser. No. 60/973,031 titled "BUFFERING TECHNIQUES FOR POWER MANAGEMENT" filed on Sep. 17, 2007, U.S. Patent Provisional Application Ser. No. 60/973,038 titled "TECHNIQUES FOR COMMUNICATIONS POWER MANAGEMENT BASED ON SYSTEM STATES" filed on Sep. 17, 2007, and U.S. Patent Provisional Application Ser. No. 60/973,044 titled "TECHNIQUES FOR COLLABORATIVE POWER MANAGEMENT FOR HETEROGENEOUS NETWORKS" filed on Sep. 17, 2007, all three of which are hereby incorporated by reference in their entirety.

BACKGROUND

Power management for electronic devices such as computer systems play an important part in conserving energy, managing heat dissipation, and improving overall system performance. Modem computers systems are increasingly designed to be used in settings where a reliable external power supply is not available making power management to conserve energy important. Power management techniques allow certain components of a computer system to be powered down or put in a sleep mode that requires less power than while in active operation, thereby reducing the total amount of energy consumed by a device over some period of time. Energy conservation is especially important for mobile devices to conserve battery power. Even when reliable external power supplies are available careful power management within the computing system can reduce heat produced by the system enabling improved performance of the system. Computing systems generally have better performance at lower ambient temperatures because key components can run at higher speeds without damaging their circuitry. Consequently, there are many advantages to enhancing power management for electronic devices.

BRIEF DESCRIPTION OF THE DRAWINGS

FIG. 3 illustrates one embodiment of a logic diagram.

DETAILED DESCRIPTION

Figure 1:
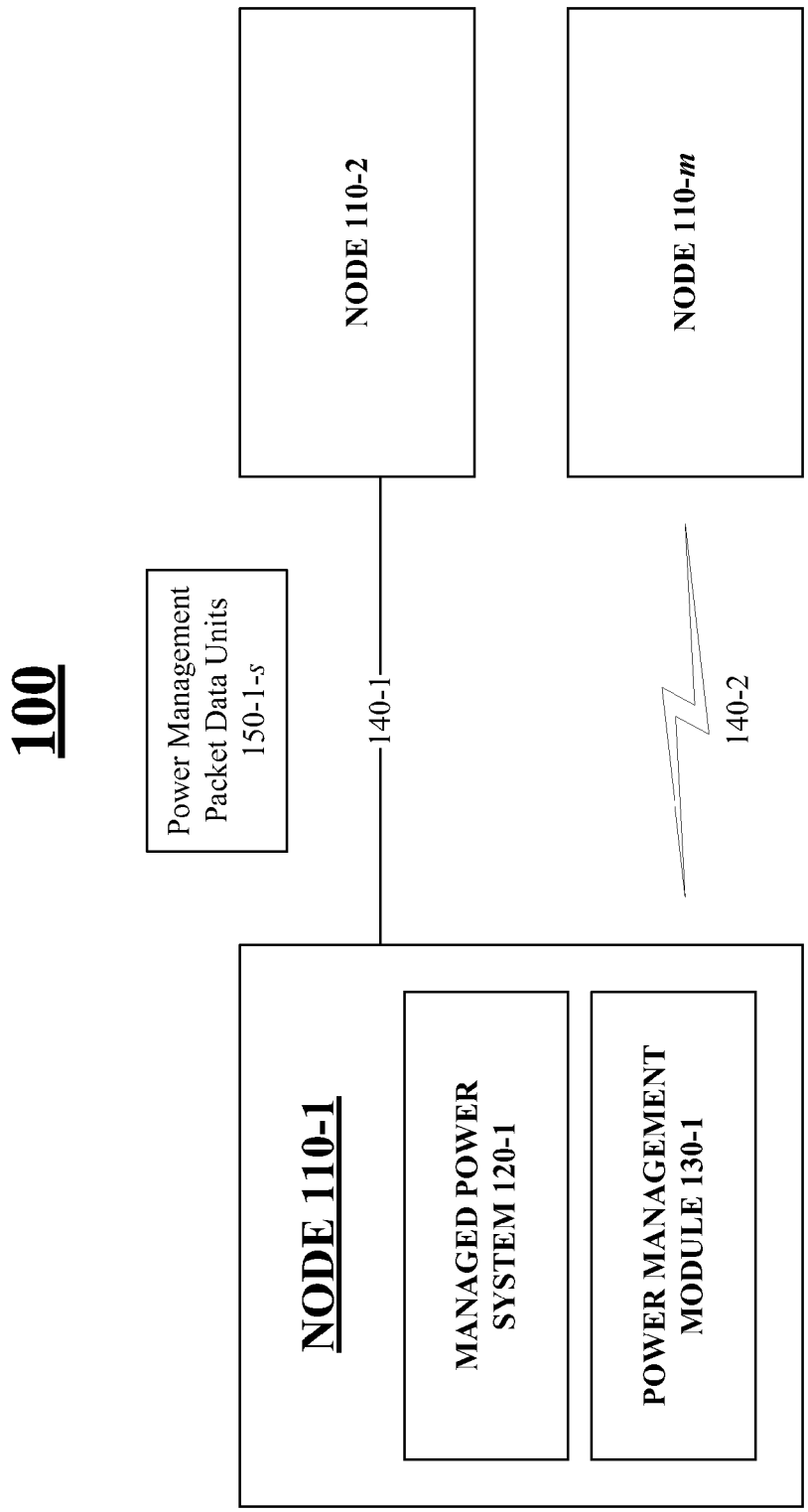
FIG. 1 illustrates one embodiment of a communications system.

Various embodiments may be generally directed to techniques for performing communications based power management. Some embodiments may be particularly directed to performing power management techniques to manage power states for one portion of a node using power state information for another portion of a node. In one embodiment, for example, the power state information may be communicated over a communications bus and uniform interfaces between the various portions of a node using various power management messages. Examples for a node may include various types of heterogeneous network endpoint and infrastructure devices or resources, such as computers, servers, switches, routers, bridges, gateways, and so forth. The power state information may indicate, for example, whether a portion of a given node is operating in a power-managed state or a full-computation state, the duration for a power-managed state, a resume latency to exit from a power-managed state, and other power related characteristics for the given node. The power management techniques may be implemented, for example, by power gating and/or clock gating various hardware elements of a node, thereby conserving battery power.

Various embodiments provide several power management enhancements over conventional power management techniques. For example, the input/output (I/O) architecture of the modern personal computer (PC) platform is essentially interrupt-based in response to external events such as mouse movement and the arrival of network packets. The implication is the PC platform (e.g., the I/O controller, host memory and chipset) continuously remains in an active power state in order to service random interrupt I/O requests. This is particularly true for interrupt I/O requests from high-speed communications devices (e.g., Gigabit Ethernet), which tend to be very bursty and non-deterministic in nature. This type of power management design typically works well for performance driven I/O devices because the platform is always active and waiting to service I/O requests. Although the platform may periodically enter a lower power state and be capable waking up in time to service interrupts from slower devices (e.g., a keyboard, camera, or mouse) without any substantial performance issues, this is not the case with high-speed communications devices. Interrupts from high-speed communications devices typically need relatively fast service, on the order of several micro-seconds, otherwise the network packets may be dropped and network performance and throughput can be adversely affected. As a result, the performance driven power management model is widely used. Although providing several performance advantages, however, such power management designs are inefficient and require a relative high level of power consumption, especially when the platform is in an active power state but the communications elements are relative idle (e.g., low network activity), which is very typical of average users.

Various embodiments attempt to solve these and other problems. Some embodiments attempt to improve power management for a node by making high-speed I/O requests more deterministic so that a computer system can aggressively and proactively power gate and/or clock gate portions of the computer system based on network traffic load. For example, the computer system can manage power levels for computer system elements such as a central processing unit (CPU), memory, controllers, and other devices based on the network traffic workload. To accomplish this, some embodiments utilize a parameterized communications device power management technique that interfaces with the platform power management architecture and conveys the idle duration, resume latency, and other communications power state information for the communications elements, components, modules, sub-systems or devices. Portions of the node can learn and benefit from network inactivity so that portions of the node can enter a lower power state, and wake up right before the arrival of the next group of network packets. By managing one or more portions of a node based on network traffic workload considerations, the node may realize enhanced energy conservation and utilize limited power resources such as batteries more efficiently.

In one embodiment, a node may include a managed power system and a power management module to manage power states for the managed power system. The managed power system may comprise, for example, any devices, components, modules, circuits, or other portions of the node drawing power from a power source, such as a battery. In one embodiment, for example, the managed power system may comprise a communications sub-system and a computing sub-system. The communications sub-system may include a network state module operative to determine communications power state information. The communications power state information may include, for example, power states for the communications sub-system, as well as one or more parameters representing certain characteristics of the power states, such as power state duration periods, idle durations, resume latencies, and so forth. The network state module may send a power management message with the communications power state information. The power management module may be operative to communicate power state information with the communications sub-system and the computing sub-system utilizing various power management messages communicated over a communications bus and appropriate interfaces for the node. The power management module may receive the power management message, retrieve the communications power state information from the power management message, and manage power states for the computing sub-system based on the communications power state information for the communications sub-system. In this manner, different portions of a node such as a network device may exchange, negotiate and synchronize power state information to improve or enhance power state management for portions of the network device in order to facilitate energy conservation across the entire network device. Other embodiments may be described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

FIG. 1 illustrates a block diagram of a communications system 100. In various embodiments, the communications system 100 may comprise multiple nodes. A node generally may comprise any physical or logical entity for communicating information in the communications system 100 and may be implemented as hardware, software, or any combination thereof, as desired for a given set of design parameters or performance constraints. Although FIG. 1 may show a limited number of nodes in a certain topology by way of example, it can be appreciated that more or less nodes may be employed in different topologies for a given implementation.

In various embodiments, the communications system 100 may comprise, or form part of, a wired communications system, a wireless communications system, or a combination of both. For example, the communications system 100 may include one or more nodes 110-1-$m$ arranged to communicate information over one or more types of wired communications links, such as a wired communications link 140-1. Examples of the wired communications link 140-1 may include without limitation a wire, cable, bus, printed circuit board (PCB), Ethernet connection, peer-to-peer (P2P) connection, back-plane, switch fabric, semiconductor material, twisted-pair wire, co-axial cable, fiber optic connection, and so forth. The communications system 100 also may include one or more nodes 110-1-$m$ arranged to communicate information over one or more types of wireless communications links, such as wireless shared media 140-2. Examples of the wireless shared media 140-2 may include without limitation a radio channel, infrared channel, radio-frequency (RF) channel, Wireless Fidelity (WiFi) channel, a portion of the RF spectrum, and/or one or more licensed or license-free frequency bands. In the latter case, the wireless nodes may include one more wireless interfaces and/or components for wireless communications, such as one or more radios, transmitters, receivers, transceivers, chipsets, amplifiers, filters, control logic, network interface cards (NICs), antennas, antenna arrays, and so forth. Examples of an antenna may include, without limitation, an internal antenna, an omni-directional antenna, a monopole antenna, a dipole antenna, an end fed antenna, a circularly polarized antenna, a micro-strip antenna, a diversity antenna, a dual antenna, an antenna array, and so forth. In one embodiment, certain devices may include antenna arrays of multiple antennas to implement various adaptive antenna techniques and spatial diversity techniques.

As shown in the illustrated embodiment of FIG. 1, the communications system 100 comprises multiple nodes 110-1-$m$. The nodes 110-1-$m$ may comprise or be implemented as any type of fixed or mobile electronic device or resource, including a network device, network endpoint equipment, network infrastructure equipment, cellular radiotelephone network equipment, a processing system, a computer system, a computer sub-system, a computer, a workstation, a terminal, a server, a personal computer (PC), a laptop computer, an ultra-laptop computer, a portable computer, a handheld computer, a personal digital assistant (PDA), a cellular telephone, a smart phone, a router, a switch, a bridge, a gateway, a network appliance, a microprocessor, an integrated circuit, a programmable logic device (PLD), a digital signal processor (DSP), a processor, a circuit, a logic gate, a register, a microprocessor, an integrated circuit, a semiconductor device, a chip, a transistor, and so forth. In some embodiments, some of the nodes 110-1-$m$ may represent heterogeneous network devices. In one embodiment, for example, the nodes 110-1-$m$ may comprise various mobile computer systems (e.g., laptop computers, handheld computers, smart phones, cellular telephones, and so forth) utilizing a mobile power source, such as one or more batteries.

In various embodiments, the nodes 110-1-$m$ may be arranged to communicate various types of information in multiple communications frames as represented by the power management packet data units (PMPDU) 150-1-$s$ via the network or communications links 140-1, 140-2. In various embodiments, the nodes 110-1-$m$ may be arranged to communicate control information related to power management operations. Examples of control information may include without limitation power information, state information, power state information, power management commands, command information, control information, routing information, processing information, system file information, system library information, software (e.g., operating system software, file system software, application software, game software), firmware, an application programming interface (API), a program, an applet, a subroutine, an instruction set, an instruction, computing code, logic, words, values, symbols, and so forth. The nodes 110-1-$m$ may also be arranged to communicate media information, to include without limitation various types of image information, audio information, v.ideo information, AV information, and/or other data provided from various media sources.

Although some of the nodes 110-1-*m* may comprise different network devices, each of the nodes 110-1-*m* may include a common number of elements as shown by the node 110-1. For example, the nodes 110-1-*m* may each include various power management elements to implement a power management scheme operative to perform power management operations for the nodes 110-1-*m*. In the illustrated embodiment shown in FIG. 1, for example, a first node 110-1 may include a managed power system 120-1 coupled to a power management module 130-1. The power management module 130-1 may be operative to communicate power state information with a second node (e.g., one of the nodes 110-2-*m*) over a communications connection established via the communications links 140-1, 140-2. In general operation, the power management module 130-1 may manage various power states for the managed power system 120-1 of the first node 110-1. The power state information may include past, present or future power states for one or more portions of a managed power system 120-1 of the first node 110-1. In this manner, the portions of a managed power system 120-1 may exchange power state information to improve or enhance power state management for the first node 110-1. For example, the power management module 130-1 may synchronize power management operations between the sub-systems 210, 230 of the managed power system 120-1, such as placing computing components of the computing sub-system 230 in lower power states based on operations or anticipated operations for the communications components of the communications sub-system 210 for a given power state duration period.

Although the node 110-1 is the only node shown in FIG. 1 to include the managed power system 120-1 and the power management module 130-1, it may be appreciated that each of the nodes 10-1-*m* may include an identical or similar managed power system 120-1-*n* and power management module 130-1-*p*. For example, the node 110-2 may include a managed power system 120-2 coupled to a power management module 130-2, the node 110-3 may include the elements 120-3, 130-3, and so forth. Furthermore, the descriptions and examples of the structures and operations provided with reference to the managed power system 120-1 and the power management module 130-1 may also apply to the corresponding elements in the other nodes 110-2-*m*. Exemplary embodiments for the managed power system 120-1-*n* and the power management module 130-1-*p* may be described in more detail with reference to FIG. 2.

Figure 2:
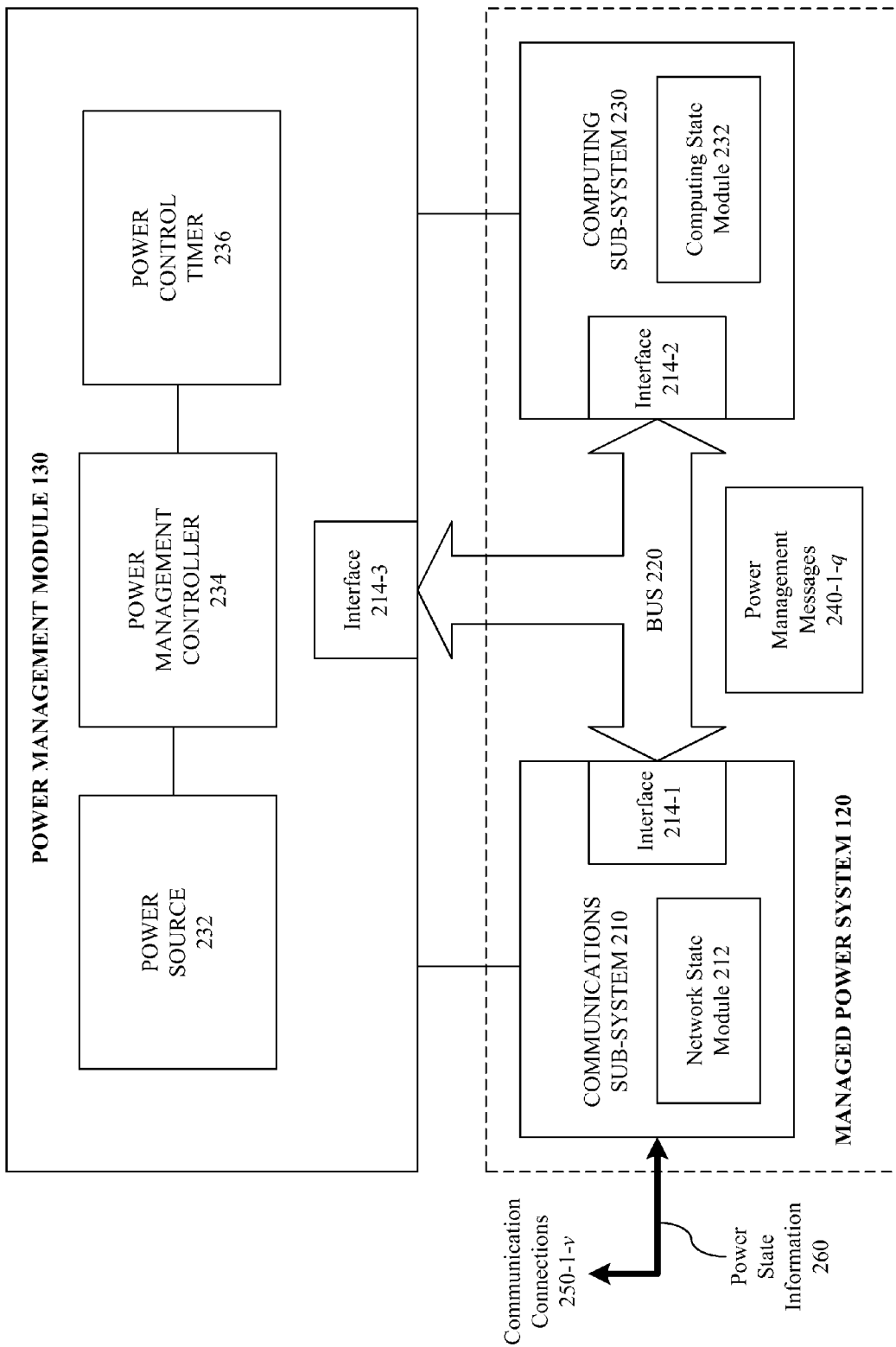
FIG. 2 illustrates one embodiment of an apparatus.

FIG. 2 illustrates a more detailed block diagram for a managed power system 120 and a power management module 130. In the illustrated embodiment shown in FIG. 2, the managed power system 120 may include a communications sub-system 210 and a computing sub-system 230. The communications sub-system 210 may further include a network state module 212 and a power management interface 214-1. The computing sub-system 230 may further include a computing state module 232 and a power management interface 214-2. The power management module 130 may further include a power source 232, a power management controller 234, and one or more power control timers 236. The power management module 130 may also include a power management interface 214-3. The interfaces 214-1, 214-2 and 214-3 may be coupled to a communications bus 220. Although FIG. 2 may show a limited number of power management elements in a certain arrangement by way of example, it can be appreciated that more or less power management elements may be employed in different arrangements for a given implementation.

In various embodiments, the managed power system 120 may include any electrical or electronic elements of the nodes 110-1-*m* consuming power from the power source 232 and suitable for power management operations. Power management techniques allow certain components of an electronic device or system (e.g., a computer system) to be powered down or put in a sleep mode that requires less power than while in active operation, thereby reducing the total amount of energy consumed by a device over some period of time. The power management techniques may be implemented by power gating and/or clock gating various hardware elements of the managed power system 120, thereby conserving battery power.

More particularly, the managed power system 120 may include various electrical or electronic elements of the nodes 110-1-*m* that can operate in various power states drawing multiple levels of power from the power source 232 as controlled by the power management controller 234 of the power management module 130. The various power states may be defined by any number of power management schemes. In some cases, for example, the power states may be defined in accordance with the Advanced Configuration and Power Interface (ACPI) series of specifications, including their progeny, revisions and variants. In one embodiment, for example, the power states may be defined by the ACPI Revision 3.0a, Dec. 30, 2005 (the "ACPI Revision 3.0a Specification"). The ACPI series of specifications define multiple power states for electronic devices, such as global system states (Gx states), device power states (Dx states), sleeping states (Sx states), processor power states (Cx states), device and processor performance states (Px states), and so forth. It may be appreciated that other power states of varying power levels may be implemented as desired for a given set of design parameters and performance constraints. The embodiments are not limited in this context.

In some embodiments, the various electrical or electronic elements of the nodes 110-1-*m* suitable for power management operations may be generally grouped or organized into the communications sub-system 210 and the computing sub-system 230. It may be appreciated, however, that the sub-systems 210, 230 are provided by way of example for purposes of clarity and not limitation, and the managed power system 120 may include other electrical or electronic elements of the nodes 110-1-*m* suitable for power management operations by the power management module 130. For example, the nodes 110-1-*m* may typically include a computer monitor or display, such as a digital electronic display or an analog electronic display. Examples of digital electronic displays may include electronic paper, nixie tube displays, vacuum fluorescent displays, light-emitting diode displays, electroluminescent displays, plasma display panels, liquid crystal displays, thin-film transistor displays, organic light-emitting diode displays, surface-conduction electron-emitter displays, laser television displays, carbon nanotubes, nanocrystal displays, and so forth. An example for analog electronic displays may include cathode ray tube displays. Computer monitors are often placed in a sleep mode when an operating system detects that the computer system has not received any input from a user for a defined period of time. Other system components may include digital cameras, touch screens, video recorders, audio recorders, storage devices, vibrating elements, oscillators, system clocks, controllers, and other platform or system architecture equipment. These other system components can also be placed in a sleep or powered down state in order to conserve energy when the components are not in use. The computer system monitors input devices and wakes devices as needed. The embodiments are not limited in this context.

In various embodiments, the managed power system 120 may include the communications sub-system 210. The communications sub-system 210 may comprise various communications elements arranged to communicate information and perform communications operations between the nodes 110-1-$m$. Examples of suitable communications elements may include any electrical or electronic element designed to communicate information over the communications links 140-1, 140-2, including without limitation radios, transmitters, receivers, transceivers, chipsets, amplifiers, filters, control logic, interfaces, network interfaces, network interface cards (NICs), antennas, antenna arrays, digital signal processors, baseband processors, media access controllers, memory units, and so forth.

In various embodiments, the managed power system 120 may include the computing sub-system 230. The computing sub-system 230 may comprise various computing elements arranged to process information and perform computing operations for the nodes 110-1-$m$. Examples of suitable computing elements may include any electrical or electronic element designed to process information, including without limitation processors, microprocessors, chipsets, controllers, microcontrollers, embedded controllers, clocks, oscillators, audio cards, video cards, multimedia cards, peripherals, memory units, memory controllers, video controllers, audio controllers, multimedia controllers, and so forth.

In various embodiments, the power management module 130 may comprise a power source 232. The power source 232 may be arranged to provide power to the elements of a node 110-1-$m$ in general, and the managed power system 120 in particular. In one embodiment, for example, the power source 232 may be operative to provide varying levels of power to the communications sub-system 210 and the computing sub-system 230. In various embodiments, the power source 232 may be implemented by a rechargeable battery, such as a removable and rechargeable lithium ion battery to provide direct current (DC) power, and/or an alternating current (AC) adapter to draw power from a standard AC main power supply.

In various embodiments, the power management module 130 may include a power management controller 234. The power management controller 234 may generally control power consumption by the managed power system 120. In one embodiment, the power management controller 234 may be operative to control varying levels of power provided to the communications sub-system 210 and the computing sub-system 230 in accordance with certain defined power states. For example, the power management controller 234 may modify, switch or transition the power levels provided by the power source 232 to the sub-systems 210, 230 to a higher or lower power level, thereby effectively modifying a power state for the sub-systems 210, 230.

In various embodiments, the power management module 130 may include one or more power control timers 236. The power control timer 236 may be used by the power management controller 234 to maintain a certain power state for a given power state duration period. The power state duration period may represent a defined time interval a node or portion of a node is in a given power state. For example, the power management controller 234 may switch the computing sub-system 230 from a higher power state to a lower power state for a defined time interval, and when the time interval has expired, switch the computing sub-system 230 back to the higher power state.

In order to coordinate power management operations for a node 110-1-$m$, the communications sub-system 210, the computing sub-system 230, and the power management module 130 may communicate various power management messages 240-1-$q$ via a communications bus 220 and the respective power management interfaces 214-1, 214-2, and 214-3. To manage power for all the devices in a system, an operating system typically utilizes standard techniques for communicating control information over a particular Input/Output (I/O) interconnect. Examples of various I/O interconnects suitable for implementation as the communications bus 220 and associated interfaces 214 may include without limitation Peripheral Component Interconnect (PCI), PCI Express (PCIe), CardBus, Universal Serial Bus (USB), IEEE 1394 FireWire, and so forth.

Referring again to FIG. 2, the communications sub-system 210 may include a network state module 212. The network state module 212 may be arranged to monitor certain states or characteristics of the communications sub-system 210, such as the traffic activity of the communications connections 250-1-$v$, capabilities information, and other operations for the various communications elements of the communications sub-system 210. The network state module 212 may send communications power management messages 240-1-$q$ to the power management module 130 with the measured characteristics. The power management module 130 may generate power state information 260 for the managed power system 120 based in part on the communications power management messages 240-1-$q$.

Similarly, the computing sub-system 230 may include a computing state module 232. The computing state module 232 may be arranged to monitor certain states or characteristics of the computing sub-system 230, such as the level of system activity, capabilities information, and other operations for the various computing elements of the computing sub-system 230. The computing state module 232 may send computing power management messages 240-1-$q$ to the power management module 130 with the measured characteristics. The power management module 130 may generate power state information 260 for the managed power system 120 based in part on the computing power management messages 240-1-$q$.

In general operation, the power management module 130-1 may perform power management operations for portions of the managed power system 120-1 of the node 110-1 based on power state information received from other portions of the first node 110-1. In some cases, for example, the power mamagement module 130-1 for the node 110-1 may be operation to receive communications power state information from the network state module 212 of the communications sub-system 210 for the managed power system 120-1 over the communications bus 220. The power management module 130-1 may manage various power states for the computing sub-system 230 of the managed power system 120-1 for the node 110-1 based on the communications power state information for the communications sub-system 210. The power management module 130-1 and the sub-systems 210, 230 may communicate the communications power state information over the communications bus 220 in accordance with various communications bus protocols.

The communications power state information may represent information explicitly or implicitly related to power states for the communications sub-system 210. The communications power state information may also represent various characteristics or attributes for the power states of the communications sub-system 210, such as power state duration periods, idle durations, resume latencies, and so forth. In one embodiment, for example, the communications power state information may include without limitation a communications power state parameter, a communications idle duration parameter, a communications resume latency parameter, or a power state duration period.

As previously described, the power management module 130-1 may control various power states for the managed power system 120-1 in accordance with one or more power management standards, such as the ACPI standard. The ACPI standard may be suitable for defining the various power states for a portion of the managed power system 120-1, such as the communications sub-system 210 and/or the computing sub-system 230. For example, the power management module 130-1 may control power consumption for a processor and chipset of the computing sub-system 230 using different processor power consumption states (e.g., C0, C1, C2, and C3) as defined by the ACPI Revision 3.0a Specification. The power management module 130-1 send power control commands to the computing sub-system 230 over the communications bus 220 and interfaces 214-2, 214-3.

In one embodiment, for example, the power management module 130 may control power consumption for the computing sub-system 230 using an abbreviated set of power states from the ACPI Revision 3.0a Specification referred to as system power states. The system power states define various power states specifically designed for the computing elements processing information for the nodes 110-1-$m$. Examples for the various system power states may be shown in Table 1 as follows:

TABLE 1

| System Power State | Description |
| --- | --- |
| S0 (On) | This power state indicates that the system is active and in full power mode. |
| S0i (Idle): Duration, Latency | This power state indicates that the system is active and in low power mode. |
| S2 (Off) | This power state indicates that the system is inactive and in off mode. |

As shown in Table 1, the system power states range from S0 to S2, where the S0 power state represents the highest power state with the maximum power draw, the S0i power state represents a lower power state relative to the S0 with a correspondingly lower power draw, and the S2 power state represents the lowest power state with the minimum power draw (or none).

Some of the system power states have associated parameters. For example, the S0i power state has a pair of parameters referred to as a computing idle duration parameter and a computing resume latency parameter. The computing idle duration parameter represents an amount of time, or defined time interval, the computing sub-system 230 will remain in a given power state (e.g., S0i). The computing resume latency parameter represents an amount of time, or defined time interval, the computing sub-system 230 needs to exit a given power state (e.g., S0i) and enter a higher power state (e.g., S0). The computing idle duration parameter and the computing resume latency parameter for the system power states may be communicated by the power management messages 240-1-$q$ over the communications bus 220.

In various embodiments, the computing state module 232 may be arranged to generate the computing idle duration parameter and the computing resume latency parameter based on the capabilities of the computing sub-system 230. For example, the computing sub-system 230 may include various processors operating at different speeds, such as a host, application or system processor. In another example, the computing sub-system 230 may include various memory units operating at different read/write speeds. In still another example, computing sub-system 230 may include various I/O devices, such as a keyboard, mouse, display, memory controllers, video controllers, audio controllers, storage devices (e.g., hard drives), expansion cards, co-processors, and so forth. The computing state module 232 may evaluate these and other computing capabilities of the computing sub-system 210, and generate the appropriate computing idle duration parameter and the computing resume latency parameter based on the evaluated capabilities of the computing sub-system 230.

Although in some embodiments the power states for the communications sub-system 210 and the computing sub-system 230 may be similarly defined and in synchronization, in some embodiments the communications power state information may also be differently defined and not synchronized for the sub-systems 210, 230. For example, the power management module 130-1 may control power consumption for a radio or network interface of the communications sub-system 210 using different power states than defined for the computing sub-system 230. In one embodiment, for example, the power management module 130-1 may control power consumption for the communications sub-system 210 using a set of power states referred to as network link power management (NLPM) power states. The NLPM power states define various network link power states specifically designed for the communications elements of the communications sub-system 210 communicating information over the given communications links 140-1, 140-2. Examples for the various NLPM power states may be shown in Table 2 as follows:

TABLE 2

| NLPM Power State | Description |
| --- | --- |
| NL0 (On) | This power state indicates that the network link is active and in full power mode. |
| NL1 (Idle): Duration, Latency | This power state indicates that the network link is active and in low power mode. |
| NL2 (Sleep): Duration, Latency | This power state indicates that the network link is inactive and in sleep mode. |
| NL3 (Off) | This power state indicates that the network link is inactive and in off mode. |

As shown in Table 2, the NLPM power states range from NL0 to NL3, where the NL0 power state represents the highest power state with the maximum power draw, the NL1 and NL2 power states represent incrementally lower power states relative to the NL0 power state with correspondingly lower power draws, and the NL3 power state represents the lowest power state with the minimum power draw (or none).

As with the system power states, some of the NLPM power states have associated parameters. For example, the NL1 (Idle) and NL2 (Sleep) power states each have an associated communications idle duration parameter and a communications resume latency parameter. The communications idle duration parameter represents an amount of time, or defined time interval, the network link or communications sub-system 210 will remain in a given power state (e.g., NL1, NL2). The communications idle duration parameter allows the sub-systems 210, 230 to enter and exit the lower power states with a deterministic manner. The communications resume latency parameter represents an amount of time, or defined time interval, the network link or communications sub-system 210 needs to exit a given power state (e.g., NL1, NL2) and enter a higher power state (e.g., NL0). The communications resume latency parameter allows the sub-systems 210, 230 to determine how soon it can expect the communications sub-system 210 to wake up and be ready for providing services such as out-going transmission. The communications idle duration parameter and the communications resume latency parameter for the NLPM power states may be communicated by the power management messages 240-1-$q$ over the communications bus 220.

In various embodiments, the network state module 212 may be arranged to generate the communications idle duration parameter and the communications resume latency parameter based on the capabilities of the communications sub-system 210. For example, the communications sub-system 210 may implement various buffers to store information received from the communications connections 250-1-$v$, such as network packets, and forward the information for servicing and processing by the computing sub-system 230. In another example, the communications sub-system 210 may also implement various buffers to store information received from the communications bus 220, such as network packets, and forward the information for communications by the communications sub-system 210 to other nodes 110-2-$m$ over the communications connections 250-1-$v$ via the communications links 140-1, 140-2. In yet another example, the communications sub-system 210 may include various wired or wireless transceiver operating at different communications speeds, such as the IEEE 802.3-2005 standard 10 Gigabit Ethernet (10GbE or 10GigE), the IEEE 802.3ba proposed standard 100 Gigabit Ethernet (100GbE or 100GigE), and so forth. In still another example, the communications sub-system 210 may include various processors operating at different speeds, such as baseband or communications processor. In still another example, the network state module 212 may monitor the rate of information being received over the communications connections 250-1-$v$ via the communications links 140-1, 140-2. In this example, the network state module 212 of the communications sub-system 210 may monitor the communications links 140-1, 140-2 to measure packet inter-arrival times. Other examples of communications capabilities may include other network traffic load measurements on the communications links 140-1, 140-2 (e.g., synchronous traffic, asynchronous traffic, burst traffic, and so forth), a signal-to-noise ratio (SNR), a received signal strength indicator (RSSI), throughput of the communications bus 220, physical layer (PHY) speed, power state information 260 for other nodes 110-2-$m$ received via one or more PMPDU 150-1-$s$, and so forth. The network state module 212 may evaluate these and other network or communications capabilities of the communications sub-system 210, and generate the appropriate communications idle duration parameter and the communications resume latency parameter based on the evaluated capabilities of the communications sub-system 210.

In various embodiments, the nodes 110-1-$m$ may use the system power states and/or the NLPM power states to enhance power management operations for a given node 110-1-$m$ to improve energy conservation (e.g., increase battery life or decrease battery size), heat dissipation or overall system performance. In one embodiment, for example, the network state module 212 of the communications sub-system 210 may monitor the communications links 140-1, 140-2 and various communications elements (e.g., radio, baseband processor, chipset, memory units, etc.) to determine communications power state information for the communications sub-system 210. The network state module 212 may send a power management message 240-1-$q$ with the communications power state information over the communications bus 220 and interfaces 214-1, 214-3 to the power management module 130-1. The power management module 130-1 may receive the power management message 240-1-$q$, and retrieve the communications power state information from the power management message 240-1-$q$. The power management module 130-1 may manage power states for the computing sub-system 230 based on the communications power state information for the communications sub-system 210. For example, the power management module 130-1 may modify a power level for a computing sub-system 230 of the managed power system 120-1 from a first power level (S0) to a second power level (S0i) using the communications power state information for the communications sub-system 210. Furthermore, the power management module 130-1 may modify the power level for the computing sub-system 230 from a first power level (S0) to a second power level (S0i) for a defined time interval, referred to as a power state duration period, as determined using the communications power state information for the communications sub-system 210.

More particularly, the network state module 212 may determine a communications idle duration parameter and a communications resume latency parameter for the communications sub-system 210. By way of example, assume the network state module 212 sends a power management message 240-1-$q$ over the communications bus 220 via the interface 214-1 to the power management module 130-1 with communications power state information for the communications sub-system 210 as follows:

> Communications Idle Duration Parameter=100 milliseconds (ms) Communications Resume Latency Parameter=1 ms The power management controller 234 of the power management module 130-1 may receive the power management message 240-1-$q$ from the communications bus 220 via the interface 214-3, and retrieve the received parameters (e.g., 100 ms /1 ms) from the communications power state information. Since the communications sub-system 210 does not expect to receive any packets from the communications link 140-1 or 140-2 for at least 100 ms, the power management controller 234 may send one or more power management messages 240-1-$q$ to the computing sub-system 230 to modify a power level for the computing sub-system 230 from a first power level S0 (On) to a second power level S0i (Idle) for a power state duration period of approximately 100 ms (or less) as determined using the communications power state information received from the network state module 212. The power state duration period of 100 ms may be measured or timed by the power control timer 236.

It may be appreciated that the power management controller 234 may also include other factors other than the received communications idle duration parameter when determining a power state duration period appropriate for the computing sub-system 210. For example, the power management controller 234 may determine a power state duration period using the communications resume latency parameter of 1 ms for the communications sub-system 210. In this case, the power control timer 236 for the computing sub-system 230 may be set for a power state duration period of 100 ms −1 ms=99 ms. In another example, the power management controller 234 may set the power control timer 236 for the computing sub-system 230 with a power state duration period that accounts for a computing resume latency parameter for the computing sub-system 230. Assume this parameter represents 2 ms, the power control timer 236 for the communications sub-system 210 may be set for a power state duration period of 100 ms−1 ms (resume latency for sub-system 210)−2 ms (resume latency for sub-system 230)=97 ms.

The power management controller 234 may also determine an appropriate power state duration period for the computing sub-system 210 using various measured characteristics of the communications links 140-1, 140-2. The network state module 212 may be arranged to monitor the communications links 140-1, 140-2 to measure certain channel, link or traffic characteristics, such as one-way or two-way latency associated with communicating packets over the communications connection 250-1-$v$. For example, the network state module 212 of the communications sub-system 210 may monitor the communications links 140-1, 140-2 to measure packet inter-arrival times, and update the power management controller with a mean or median packet inter-arrival time. The power management controller 234 may increase or decrease the power state duration period to account for network link latencies using the measured packet inter-arrival time. Other modifiers for the power state duration period may include other network traffic load measurements on the communications links 140-1, 140-2 (e.g., synchronous traffic, asynchronous traffic, burst traffic, and so forth), a signal-to-noise ratio (SNR), a received signal strength indicator (RSSI), throughput of the communications bus 220, physical layer (PHY) speed, power state duration periods for other portions of the node 110-1, and so forth.

In addition to modifying a power state for the computing sub-system 230 based on the power state information 260 from the second node 110-2, the power management controller 234 may also modify a power state for the communications sub-system 210. Since the communications sub-system 210 will not expect to receive any packets from the communications connections 250-1-$v$ for at least 100 ms, the power management controller 234 may also send one or more power management messages 240-1-$q$ to the communications sub-system 210 to modify a power level for the communications sub-system 210 from a first power level NL0 (On) to a second power level NL1 (Idle) for a power state duration period of approximately 90 ms so it can save system power, yet be able to wake up soon enough to service any incoming traffic or events received from the communications connections 250-1-$v$ or the computing sub-system 230.

In one embodiment, the power management module 130-1 may receive communications power state information from the communications sub-system 210 and computing power state information from the computing sub-system 230, and negotiate a power state for both sub-systems 210, 230 using the received power state information. For example, prior to modifying power states for the sub-systems 210, 230, the sub-systems 210, 230 may send capabilities information, estimated traffic loads, power management schedules, and other power management related information to the power management controller 234. The power management controller 234 may use the capabilities information and estimated traffic loads to negotiate an appropriate NLPM power state, system power state, power state duration period, and associated parameters (e.g., idle duration, resume latency) suitable for a power management policy for the entire node 110-1. In this manner, the sub-systems 210, 230 may synchronize power management operations based on traffic load and power states to enhance energy conservation across all the components of the node 110-1.

FIG. 3 illustrates a logic flow 300 in accordance with one or more embodiments. The logic flow 300 may be performed by various systems and/or devices and may be implemented as hardware, software, and/or any combination thereof, as desired for a given set of design parameters or performance constraints. For example, the logic flow 300 may be implemented by a logic device (e.g., processor) and/or logic (e.g., instructions, data, and/or code) to be executed by a logic device. For purposes of illustration, and not limitation, the logic flow 300 is described with reference to FIGS. 1-2.

The logic flow 300 may illustrate various operations for the nodes 110-1-$m$ in general, and the managed power system 120 and the power management module 130 in particular. As shown in FIG. 3, the logic flow 300 may receive a power management message with communications power state information over a communications bus by a power management module from a communications sub-system of a managed power system at block 302. The logic flow 300 may determine a computing power state and a computing power state duration period for a computing sub-system of the managed power system based on the communications power state information at block 304. The logic flow 300 may switch the computing sub-system to the computing power state for the computing power state duration period at block 306. The embodiments are not limited in this context.

In one embodiment, the logic flow 300 may receive a power management message with communications power state information over a communications bus by a power management module from a communications sub-system of a managed power system at block 302. For example, the network state module 212 of the node 110-1 may send communications power state information to the power management module 130-1 over the communications bus 220 and interface 214-1. The communications power state information may include a communications idle duration parameter and a communications resume latency parameter for the communications sub-system 210-1 of the managed power system 120-1. The power management module 130-1 may receive the power management message with the communications power state information from the communications bus 220 via the interface 214-3.

In one embodiment, the logic flow 300 may determine a computing power state and a computing power state duration period for a computing sub-system of the managed power system based on the communications power state information at block 304. The computing power state may represent a given power state for the computing sub-system 230. The computing power state duration period may represent a time period or time interval when the computing sub-system 230 should be in a given power state. For example, the power management controller 234 of the node 110-1 may determine the computing power state and computing power state duration period by evaluating, among other factors, the received communications idle duration parameter and the communications resume latency parameter for the communications sub-system 210.

In one embodiment, the logic flow 300 may switch the computing sub-system to the computing power state for the computing power state duration period at block 306. For example, the power management module 130-1 may switch the computing sub-system 230 between various power states for various durations based on the computing power state and computing power state duration period determined at block 304. For example, the power management module 130-1 may switch the computing sub-system 230 for the managed power system 210 from an active power state (S0) to an idle power state (S0i) for the power state duration period (e.g., 90 ms).

In addition to controlling the power states for the computing sub-system 230 based on the communications power state information, the power management module 130-1 may also control power states for the communications sub-system 210 based on the communications power state information. In some cases, the power management module 130-1 may control power states for the communications sub-system 210 using the same or similar parameters for the computing sub-system 230. For example, the power management module 130-1 may instruct the communications sub-system 210 to switch to a communications power state equivalent to the computing power state for the computing power state duration period using one or more power management messages 240-1-$q$. In other cases, the power management module 130-1 may control power states for the communications sub-system 210 using different parameters then those used for the computing sub-system 230. For example, the power management module 130-1 may determine a separate and different communications power state and a communications power state duration period for the communications sub-system 210 based on the communications power state information generated by the network state module 212. The power management module 130-1 may instruct the communications sub-system 210 to switch to the communications power state for the communications power state duration period using one or more power management messages 240-1-$q$.

In some cases, various embodiments may be implemented as an article of manufacture. The article of manufacture may include a computer-readable medium or storage medium arranged to store logic and/or data for performing various operations of one or more embodiments. Examples of computer-readable media or storage media may include, without limitation, those examples as previously described. In various embodiments, for example, the article of manufacture may comprise a magnetic disk, optical disk, flash memory or firmware containing computer program instructions suitable for execution by a general purpose processor or application specific processor. The embodiments, however, are not limited in this context.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Examples of what could be claimed include the following:

The invention claimed is:

1. An apparatus, comprising:
   a managed power system comprising:
      a communications sub-system;
      and a computing sub-system,
      the communications sub-system to include a media access controller and a PHY to provide a communications connection, a network state module operative to (a) determine communications power state information based on, at least in part, on at least one of (1) a status of the communications connection, or (2) at least one communication element of the communications sub-system and (b) send a power management message with the communications power state information; and
   a power management module to couple to the managed power system, the power management module to receive the power management message, retrieve the communications power state information from the power management message, and manage power states for the computing sub-system based on the communications power state information.

2. The apparatus of claim 1, the network state module to determine a communications idle duration parameter and a communications resume latency parameter for the communications sub-system, and send the power management message with the communications idle duration parameter and the communications resume latency parameter to the power management module.

3. The apparatus of claim 2, comprising the communications power state information including one or more communications capabilities of the communications sub-system, the communications idle duration parameter and the communications resume parameter based on the one or more communication capabilities of the communications sub-system.

4. The apparatus of claim 1, the power management module to determine a power state duration period using a communications idle duration parameter and a communications resume latency parameter, and modify a power level for the computing sub-system from a first power level to a second power level for the power state duration period.

5. The apparatus of claim 1, the power management module having a power source operative to provide varying levels of power to the computing sub-system based on the communications power state information for the communications sub-system.

6. The apparatus of claim 1, the power management module having a power management controller operative to control varying levels of power provided to the computing sub-system from a power source based on the communications power state information for the communications sub-system.

7. The apparatus of claim 1, the power management module having a power control timer operative to provide timing information to control varying time periods when varying levels of power are provided to the computing sub-system based on the communications power state information for the communications sub-system.

8. The apparatus of claim 1, the managed power system and the power management module each having a common interface to communicate the power management messages.

9. The apparatus of claim 1, the power management module to manage power states for the communications sub-system based on the communications power state information.

10. The apparatus of claim 1, the managed power system including a digital electronic display.

11. The apparatus of claim 1, comprising the network state module operative to determine the communications state power information based on one or more communications capabilities of the communications sub-system.

12. The apparatus of claim 11, comprising the communications capabilities to include at least one of maintaining buffers to store network packets received via a communications connection, maintaining buffers to store information received via a communications bus, a wired transceiver capable of operating at one or more communications speeds, a wireless transceiver capable of operating at one or more communications speeds, measured packet inter-arrival times for network packets received via a communications connection, measured network traffic load on a communications connection, a signal-to-noise ratio for a communications connection, a received signal strength indicator for a communications connection or a throughput of a communications bus.

13. A method, comprising:
receiving a power management message with communications power state information over a communications bus by a power management module from a communications sub-system of a managed power system, the communications sub-system having a media access controller and a PHY to provide a communications connection, the power management message based on at least one characteristic of the communications sub-system;
determining a computing power state and a computing power state duration period for a computing sub-system of the managed power system based on the communications power state information; and
switching the computing sub-system to the computing power state for the computing power state duration period.

14. The method of claim 13, comprising determining a communications idle duration parameter for the communications sub-system as the communications power state information.

15. The method of claim 13, comprising determining a communications resume latency parameter for the communications sub-system as the communications power state information.

16. The method of claim 13, comprising:
determining a communications power state and a communications power state duration period for the communications sub-system based on the communications power state information; and
switching the communications sub-system to the communications power state for the communications power state duration period.

17. The method of claim 13, comprising switching the computing sub-system from an active power state to an idle power state for the computing power state duration period.

18. The method of claim 13, comprising switching the communications sub-system from an active power state to an idle power state for the communications power state duration period.

19. The method of claim 13, comprising the communications power state information including one or more communications capabilities of the communications sub-system.

20. An article comprising a non-transitory computer-readable medium containing instructions that if executed enable a system to:
receive a power management message with communications power state information over a communications bus by a power management module from a communications sub-system of a managed power system, the communications sub-system having a media access controller and a PHY to provide a communications connection, the power management message based on at least one characteristic of the communications sub-system;
determine a computing power state and a computing power state duration period for a computing sub-system of the managed power system based on the communications power state information; and
switch the computing sub-system to the computing power state for the computing power state duration period.

21. The article of claim 20, further comprising instructions that if executed enable the system to switch the communications sub-system to the computing power state for the computing power state duration period.

22. The article of claim 20, further comprising instructions that if executed enable the system to determine a communications idle duration parameter for the communications sub-system as the communications power state information.

23. The article of claim 20, further comprising instructions that if executed enable the system to determine a communications resume latency parameter for the communications sub-system as the communications power state information.

24. The article of claim 20, further comprising instructions that if executed enable the system to:
determine a communications power state and a communications power state duration period for the communications sub-system based on the communications power state information; and
switching the communications sub-system to the communications power state for the communications power state duration period.

25. The article of claim 20, comprising the communications power state information including one or more communications capabilities of the communications sub-system.

\* \* \* \* \*